United States Patent Office 3,131,207
Patented Apr. 28, 1964

3,131,207
DERIVATIVES OF PHOSPHONITRILIC ACID-ORTHOPHOSPHORIC ACID ANHYDRIDE AND PROCESS FOR PREPARING THEM
Rudi F. W. Rätz, Hamden, Conn., assignor to Olin Mathieson Chemical Corporation, a corporation of Virginia
No Drawing. Filed Jan. 25, 1962, Ser. No. 168,829
17 Claims. (Cl. 260—461)

This invention relates to derivatives of phosphonitrilic acid-orthophosphoric acid anhydride and to the process for preparing them.

Certain alkyl-substituted phosphorus-containing compounds have been used extensively as gasoline additives to suppress pre-ignition and to inhibit fouling of spark plugs. Relatively large proportions of these alkyl-substituted phosphorus-containing compounds must be employed to obtain the desired effects on the gasoline. These large proportions of additives are undesirable because they act as a diluent and substantially decrease the octane rating of the gasoline. There is a great need at the present time for alkyl-substituted phosphorus-containing compounds which have a relatively high phosphorus content, and which can be added in reduced amounts to gasoline to obtain satisfactory suppression of pre-ignition and suppression of fouling of spark plugs, without adversely affecting the octane rating of the gasoline.

It is an object of this invention to provide novel aliphatic-substituted derivatives of cyclic phosphonitrilic orthophosphoric acid anhydride.

A further object of the invention is to provide a novel method for preparing aliphatic-substituted derivatives of cyclic phosphonitrilic-orthophosphoric acid anhydride.

Still another object of the invention is to provide novel gasoline additives having a relatively high phosphorus content which can be added to gasoline in reduced proportions.

It has now been discovered that cyclic derivatives of phosphonitrilic acid-orthophosphoric acid anhydride are formed in substantially quantitative yields when polymeric phosphonitrilic halides are reacted with an aliphatic ester of orthophosphoric acid.

The polymeric phosphonitrilic halides suitable for use as a reactant are represented by the formula:

(I) $(X_2P\equiv N)_n$ where X is a halide such as chlorine, bromine or fluorine, and preferably chlorine or bromine, and $n$ is a whole number of at least three and up to about seven or higher. Preferably the trimeric or tetrameric phosphonitrilic halides are employed. The trimeric and tetrameric forms of phosphonitrilic halides are represented by the following cyclic structures:

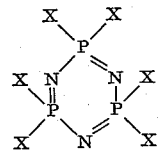

(II) Trimeric phosphonitrilic halide

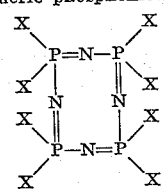

(III) Tetrameric phosphonitrilic halide

In Formulae II and III, X has the meaning defined above. Aliphatic esters of orthophosphoric acid which are suitable for use as a reactant in the instant novel process may be represented by the following formula:

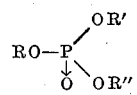

(IV)

where R is a lower alkyl radical containing between one and about 6 carbon atoms, and R' and R" are radicals selected from the group consisting of hydrogen, alkyl containing between about one and about 18 carbon atoms, substituted alkyl, aryl, substituted aryl, and cycloalkyl. R' and R" may be the same or different radicals, and when R' and R" are alkyl radicals having between one and about 6 carbon atoms, they may be the same as R or different from R. Typical examples of suitable aliphatic esters of orthophosphoric acid include trimethyl phosphate, triethyl phosphate, tripropyl phosphate, tributyl phosphate, triamyl phosphate, trihexyl phosphate, methyl dibutyl phosphate, ethyl dihexyl phosphate, methyl didodecyl phosphate, butyl didodecyl phosphate and the like; methyl dihydrogen phosphate, butyl dihydrogen phosphate, hexyl dihydrogen phosphate, dimethyl hydrogen phosphate, dipropyl hydrogen phosphate, dihexyl hydrogen phosphate, and the like; octyl ethyl hydrogen phosphate, dodecyl butyl hydrogen phosphate, propyldecyl hydrogen phosphate, and the like; methyl bis (beta-chloroethyl) phosphate, butyl bis (beta-chloroethyl) phosphate, hexyl bis (beta-chloroethyl) phosphate, the corresponding fluorine and bromine-substituted equivalents of these, and the like; methyl diphenyl phosphate, butyl diphenyl phosphate, ethyl dicresyl phosphate, hexyl dicresyl phosphate, and the like; propyl bis (para-chlorophenyl) phosphate, ethyl bis (para-chlorophenyl) phosphate, the corresponding fluorine and bromine substituted equivalents, and the like; ethyl bis (cyclohexyl) phosphate, butyl bis (cyclohexyl) phosphate and the like; ethyl bis (1-naphthyl) phosphate, ethyl bis (4-nitrophenyl) phosphate, methyl catechol phosphate, cyclohexyl bis (isoamyl) phosphate, and the like, and mixtures thereof.

The proportions of aliphatic ester of orthophosphoric acid and phosphonitrilic halide reacted in the novel process are equivalent to a molar ratio of aliphatic ester of orthophosphoric acid per monomeric unit of $X_2PN$ in the phosphonitrilic halide polymer of between about 2:1 and about 4:1, and preferably between about 2:1 and about 2.5:1. If a molar ratio of less than about 2:1 is employed, complete substitution of the halide on the phosphonitrilic halide ring is not effected. Molar ratios of greater than about 4:1 may be employed, but the unreacted alphatic orthophosphate must be separated by distillation or other suitable means from the product.

The reaction is carried out at a temperature between about room temperature and about 250° C., and preferably between about 160 and about 200° C. The reaction proceeds slowly at temperatures below about 100° C., and at temperatures above 250° C., decomposition of the reaction product is effected. Therefore, the reaction may be carried out at any temperature sufficient to give the desired rate of reaction without effecting decomposition of the reaction product.

Unlike most reactions of phosphonitrilic halides with other reactants, the reaction of the phosphonitrilic halide and aliphatic ester of orthophosphoric acid of the instant invention proceeds rapidly, and substantially complete reaction can be obtained in as little as 45 minutes to about one hour when the temperature is maintained within the above mentioned preferred range. However when temperatures below about 160° C. are employed, substantially complete reaction may not be obtained until after a period of about 3 hours.

The pressure conditions during the reaction are not critical, and the reaction may be carried out under sub-atmospheric, atmospheric, or super-atmospheric conditions. However it is preferred to employ a slight vacuum during the reaction to remove as rapidly as possible the gaseous reaction products from the system.

The reaction of the phosphonitrilic halide and aliphatic-substituted orthophosphoric acid ester is represented by the following formula:

(V)
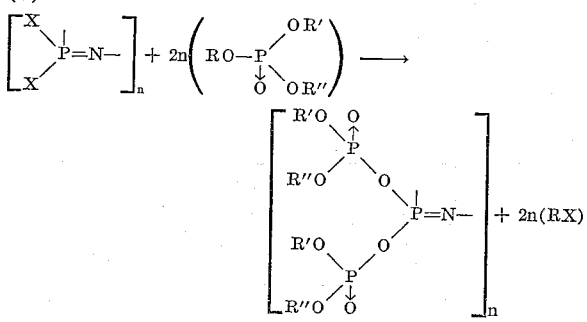

where X, R, R', R'' and $n$ have the meanings defined above.

When a trimeric phosphonitrilic halide is employed as a reactant, the trimeric ester reaction product is represented by the following formula:

(VI)
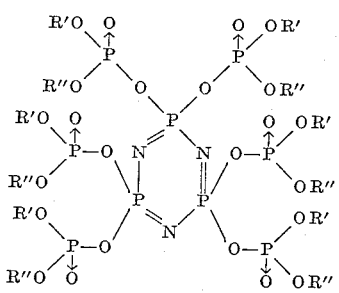

where R' and R'' have the meanings defined above.

When a tetrametric phosphonitrilic halide is employed as a reactant, the tetrameric ester product has the formula:

(VII)
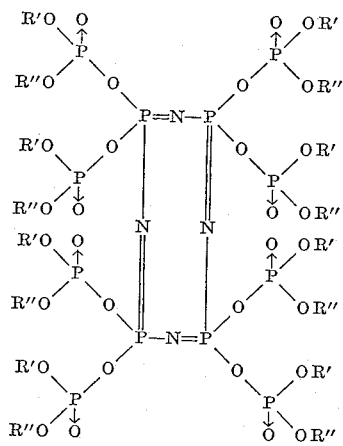

where R' and R'' have the meanings defined above.

In the above mentioned Formula VI where R' and R'' are $C_4H_9-$, the trimeric ester products has a phosphorus content of over 20 percent by weight. This represents an increase in the phosphorus content of more than 30 percent, when compared with the phosphorus content of conventional butyl-substituted orthophosphoric esters used as gasoline additives. The novel esters of the instant invention, when added to gasolines, are as effective or more effective in suppressing pre-ignition and inhibiting fouling of spark plugs, when compared to phosphorus-containing gasoline additives available heretofore.

The following examples are presented to further illustrate the invention without any intention of being limited thereby. All parts and percentages are by weight unless otherwise specified.

*Example I*

Trimeric phosphonitrilic chloride (5.379 grams) was mixed with 16.88 grams triethyl orthophosphate and heated at 160–180° C. A vigorous evolution of ethyl chloride took place for a period of about 45 minutes. It was condensed by cooling the receiver in an ice-salt bath. Ethyl chloride (6.3 grams) was condensed, and the theoretical amount calculated for the reaction was 6.2 grams. The residue in the flask was a lightly colored oil (15.8 grams) of the following composition:

|  | Percent C | Percent H | Percent P | Percent N |
|---|---|---|---|---|
| Found | 26.55 | 5.65 | 26.05 | 4.11 |
| Theoretical | 27.30 | 5.70 | 26.45 | 3.95 |

Infrared analyses of the product indicated that the product had a structural formula similar to Formula VI above where R, R' and R'' were ethyl groups.

*Example II*

$(PNCl_2)_3$ (3.48 grams; $\frac{1}{100}$ mole) was mixed with 15.98 grams tributyl orthophosphate and heated in an oil bath at 170° C. for about 60 minutes. During this time, butyl chloride was evolved and condensed in an ice-cooled receiver. When the temperature of the reaction reached 190° C., the evolution of butyl chloride ceased, and 5.4 grams of butyl chloride was condensed; the theoretical amount calculated for the reaction was 5.5 grams. The residue in the flask was a clear and viscous light-yellow oil (13.8 grams) which was soluble in common organic solvents and underwent hydrolysis in water. Phosphorus content of the oil product was as follows:

Percent P
Found _____ 20.9
Theoretical _____ 20.15

*Example III*

In a similar way, 4.64 grams of $(PNCl_2)_4$ ($\frac{1}{100}$ mole) and 15.36 grams of triethyl orthophosphate ($\frac{8}{100}$ mole) were heated at 160–180° C. for about 60 minutes. Five grams ethyl chloride were condensed and 14.6 grams of product remained in the flask. The phosphorus content of the product was as follows:

Percent P
Found _____ 26.65
Theoretical _____ 26.45

*Example IV*

A mixture of 3.48 grams of trimeric phosphonitrilic chloride and 13.44 grams of tripropyl orthophosphate were reacted at 175–190° C. Propyl chloride (4.68 grams) was evolved and collected within a period of one hour. The residue, a slightly colored oil, weighed 12.0 grams. Chemical analyses of the product showed a phosphorus content as follows:

Percent P
Found _____ 22.5
Theoretical _____ 22.8

In addition to being suitable for use as gasoline additives, the novel cyclic esters of this invention are also suitable for use as intermediates in the preparation of other organic phosphorus compounds, insecticides, fungicides, oil additives and the like. They may also be employed as plastic modifiers and as flame-proofing agents, and as intermediates in the preparation of these compounds.

It will be understood by those skilled in the art that various modifications of the invention, some of which have been referred to above, may be made without departing from the spirit of the invention. What is desired to be secured by Letters Patent is:

1. A cyclic compound of the formula:

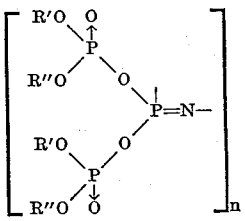

where R' and R" are selected from the group consisting of hydrogen, alkyl having between 1 and about 18 carbon atoms, halogen-substituted alkyl selected from the group consisting of chloroalkyl, bromoalkyl and fluoroalkyl, aryl selected from the group consisting of phenyl, cresyl and naphthyl, substituted-aryl selected from the group consisting of chloro-, bromo-, fluoro-, nitro- and hydroxy-substituted phenyl, and cycloalkyl, and wherein $n$ is an integer between about 3 and about 7.

2. A cyclic compound of the formula:

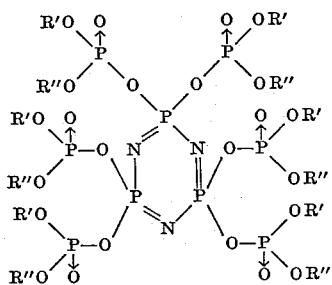

where R' and R" are each an alkyl having between 1 and about 18 carbon atoms.

3. A cyclic compound of the formula:

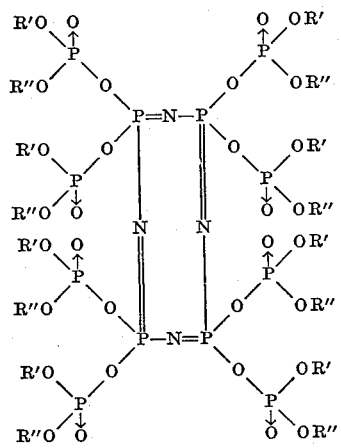

where R' and R" are each an alkyl having between 1 and about 18 carbon atoms.

4. The process for preparing a cyclic compound of the formula:

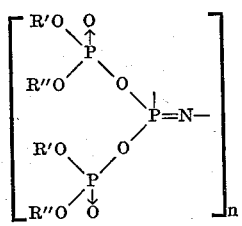

where R' and R" are selected from the group consisting of hydrogen, alkyl having between 1 and about 18 carbon atoms, halogen-substituted alkyl selected from the group consisting of chloroalkyl, bromoalkyl and fluoroalkyl, aryl selected from the group consisting of phenyl, cresyl and naphthyl, substituted aryl selected from the group consisting of chloro-, bromo-, fluoro-, nitro-, and hydroxy-substituted phenyl, and cycloalkyl, which comprises reacting a phosphonitrilic halide of the formula $(X_2P \equiv N)_n$, where X is selected from the group consisting of chlorine, bromine and fluorine, and where $n$ is an integer between about 3 and about 7, with an aliphatic-substituted orthophosphoric acid ester represented by the formula:

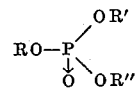

where R is lower alkyl containing between 1 and about 6 carbon atoms and R' and R" are defined as above, said reaction being carried out at a temperature and for a time and in proportions effective to produce said cyclic compounds.

5. The process of claim 4 wherein the temperature is in the range between about 100 and about 250° C.

6. The process of claim 4 wherein X is chlorine, $n$ is 3, R, R' and R" are methyl.

7. The process of claim 4 wherein X is chlorine, $n$ is 3, R, R' and R" are ethyl.

8. The process of claim 4 wherein X is chlorine, $n$ is 3, R, R' and R" are propyl.

9. The process of claim 4 wherein X is chlorine, $n$ is 3, R, R' and R" are butyl.

10. The process of claim 4 wherein X is chlorine, $n$ is 3, R, R' and R" are amyl.

11. The process of claim 4 wherein X is chlorine, $n$ is 3, R, R' and R" are hexyl.

12. The process of claim 4 wherein X is chlorine, $n$ is 4, R, R' and R" are methyl.

13. The process of claim 4 wherein X is chlorine, $n$ is 4, R, R' and R" are ethyl.

14. The process of claim 4 wherein X is chlorine, $n$ is 4, R, R' and R" are propyl.

15. The process of claim 4 wherein X is chlorine, $n$ is 4, R, R' and R" are butyl.

16. The process of claim 4 wherein X is chlorine, $n$ is 4, R, R' and R" are amyl.

17. The process of claim 4 wherein X is chlorine, $n$ is 4, R, R' and R" are hexyl.

References Cited in the file of this patent
UNITED STATES PATENTS
2,876,247    Ratz et al. _____ Mar. 3, 1959